United States Patent Office 2,771,262
Patented Nov. 20, 1956

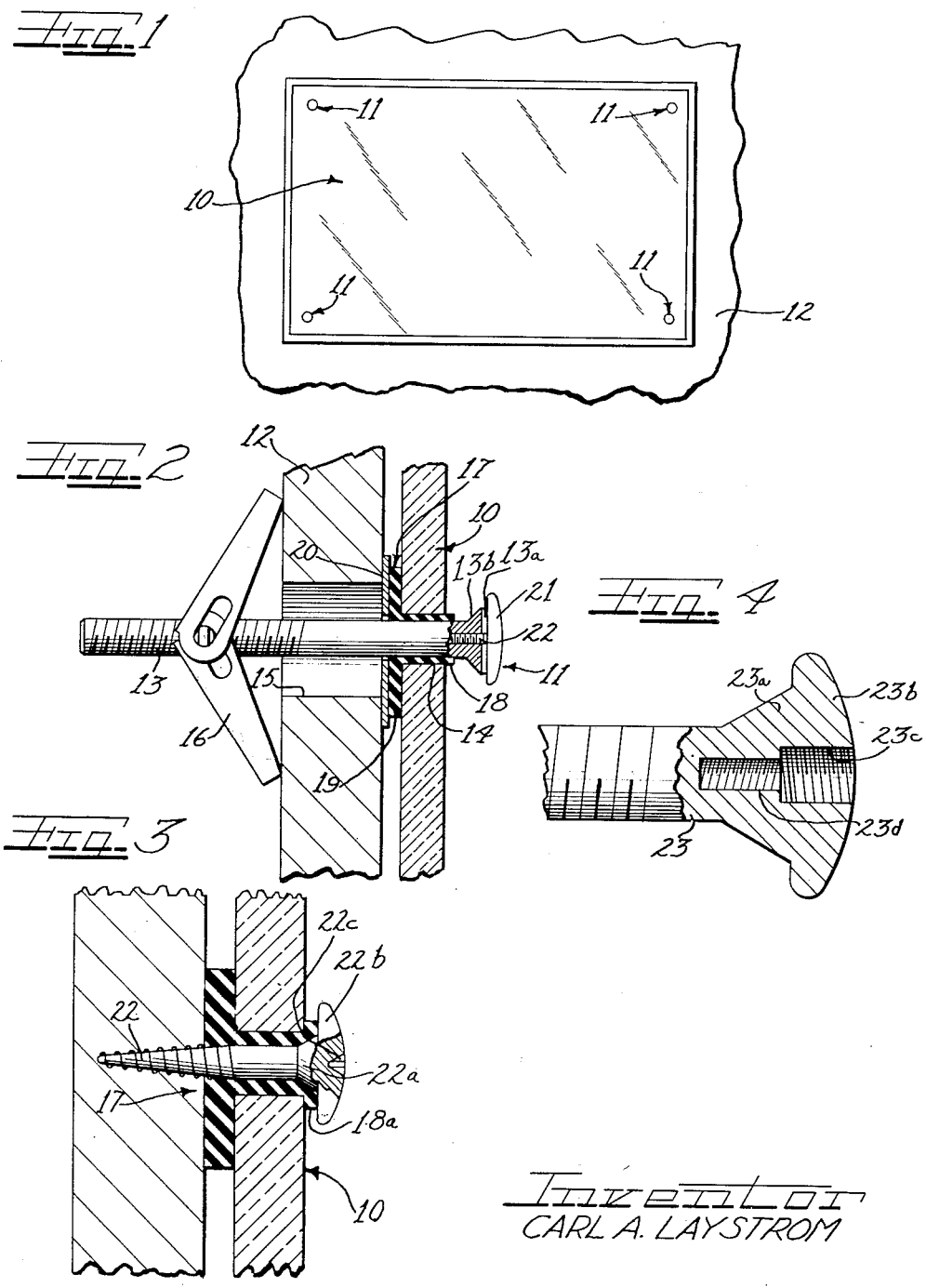

2,771,262

COMBINATION OF THREADED BOLT AND DE-FORMABLE BUSHING FOR SUPPORTING FRANGIBLE PLATE ON A WALL

Carl A. Laystrom, Decatur, Ill., assignor to Faries Manufacturing Company, Decatur, Ill., a corporation of Illinois Application December 15, 1954, Serial No. 475,386

2 Claims. (Cl. 248—216)

The present invention relates to fastening apparatus for use with brittle, or otherwise breakable objects to be secured to vertical support surfaces such as walls.

More particularly, the invention relates to a screw fastening apparatus constructed and arranged to permit the fastening of objects such as mirrors or other glass plates to wall surfaces directly without danger of breaking the mirror or glass as a result of pressure applied during the fastening operation and simultaneously resiliently mounting the mirror against breakage resulting from vibration after installation.

As has been explained at some length in my prior copending application Serial No. 381,568, entitled "Wall Mirror Mounting," filed April 10, 1952, a major problem in connection with the hanging of heavy wall mirrors or the like has been the breakage of the mirror around the fastener. Such breakage is apt, when using prior art devices, to occur during the installation of the mirror and even though breakage does not occur during installation it is a constant threat after installation when prior art fastening structures are used. In the prior art, no truly satisfactory means were provided for completely isolating the mirror or glass from the fastening means both during and after installation. The present invention provides a completely satisfactory arrangement and is an improvement over the structure disclosed in the above mentioned copending application which likewise provided a satisfactory, though somewhat more complex, mirror mounting structure.

According to the present invention, a mirror or glass may be directly mounted to a supporting surface by means of a plurality of screws or bolts passing through apertures in the glass. In order to obviate the possibility of breakage, a tubular, flanged, resilient bushing member is installed in the glass with its flange positioned between the glass and the supporting surface and the tubular portion of the bushing extending into and completely through the aperture in the glass. In accordance with the present invention, the tubular bushing is constructed of a length somewhat longer than the thickness of the glass plate which is to be supported thereon and accordingly a portion of the resilient bushing projects from the front face of the glass. A screw fastening member is then passed through the tubular portion of the bushing into the supporting surface and tightened down. During the tightening operation the projecting portion of the tubular resilient bushing is spread apart and flattened down against the front face of the glass to provide a resilient cushion at all points in and adjacent the aperture in the glass.

As a result of the simple bushing above described, the relatively narrow area of rubber or the like is positioned immediately around the shank of the fastening screw and between the under side of the fastening screw head and the mirror. By providing a bezel cover on the screw, or alternatively by providing a truss head screw having a relatively large diameter, decorative, head, all of the rubber between the screw head and the plate glass is hidden from view. Further, through the use of the present invention, installation of mirrors or the like is extremely simple since the tubular flange bushing may very easily be assembled in the mirror apertures. This latter is the case since the external diameter of the tubular portion of the rubber bushing is, in the unstressed condition of the bushing, substantially identical to the inside diameter of the aperture with which the bushing is to be associated. Accordingly, it is merely necessary, during the installation, to insert the bushing into the mirror aperture by pressing against it from the rear of the mirror. No manipulations whatever of the rubber bushing itself are required.

Accordingly, it is an object of the present invention to provide an extremely simple, yet effective, resilient mirror hanger or the like.

Still another object of the present invention is to provide a novel hanger for the direct support of frangible objects.

Still another object of the present invention is to provide a greatly simplified mirror hanging apparatus.

Still a further object of the invention is to provide a direct hanger apparatus for the support of frangible objects and which is automatically deformed during installation to resiliently support the frangible object from all directions in which force is applied.

A feature of the invention is the use of a resilient bushing having a tubular portion for passage through the frangible object to be supported, which tubular portion projects outwardly from the front face of the frangible object prior to assembly of the frangible object to a supporting wall or the like.

Another feature of the present invention resides in the provision of a mounting screw in cooperation with the tubular flange bushing whereby the tubular portion of the bushing is automatically spread and compressed outwardly against the front face of a mirror or the like by means of a tapered portion on the shank of the screw.

Yet a further object of the present invention is to provide a mirror mounting or similar mounting structure having an absolute minimum of parts, without at the same time sacrificing any protective functions.

Still other and further objects of the present invention will at once become apparent to those skilled in the art from a consideration of the attached drawings wherein preferred embodiments of the present invention are shown by way of illustration only, and wherein:

Figure 1 is a side elevational view of a mirror or the like suspended on a wall by means of four of the novel hangers of the present invention;

Figure 2 is an enlarged sectional view in partial cross-section of a hanger constructed according to the present invention immediately prior to the final tightening operation in the assembly thereof;

Figure 3 is a view in partial cross-section illustrating a mounting apparatus in its final assembled condition; and Figure 4 is a cross-sectional view of a modified form of fastening screw constructed in accordance with the present invention.

As shown on the drawings:

As illustrated in Figure 1 of the drawings, a mirror 10 is supported on a wall or similar surface by means of four fasteners generally indicated at 11. Although it is ordinarily desirable to utilize four hangers as shown, nevertheless it will be understood that any convenient number of hangers may be utilized and in view of the extreme flexibility permitted by the hanger structure of the present invention, such hangers may be distributed about the mirror in any decorative fashion desired.

Each of the hangers 11 is preferably constructed in accordance with the showings of Figures 2, 3 and 4. As shown in Figure 1, a glass plate or the mirror 10 is screwed to a plaster wall or the like 12 by means of a bolt 13 passing through the aperture 14 in the mirror 10, the aperture 15 in the wall 12, and the nut portion of a conventional toggle 16 positioned behind the wall 12. In accordance with the present invention, the aperture 14 in the glass 10 is constructed with a diameter somewhat in excess of the external diameter of the bolt 13 to permit a tubular bushing generally indicated at 17 to be inserted between the bolt 13 and the glass 10. The bushing 17 is of tubular construction and has a relatively small diameter tubular portion 18 and a large diameter flange 19. As may be seen from a consideration of Figure 2, the tubular portion 18 projects outwardly from the front surface of the mirror 10 a slight distance in the unstressed condition. Likewise, in the unstressed condition, the flange 19 is positioned between the back of the mirror 10 and the outer surface of the wall 12. In the case shown in Figure 2 wherein a large diameter aperture is provided in the wall 12 to permit the passage of the toggle 16, a metal washer 20 is preferably provided to provide firm support for the tubular bushing.

With the parts assembled in the general relationship shown in Figure 2, the bolt 13 is turned in the usual fashion by means of a slot 13a unil it is moved snugly against the front face of the mirror 10. Preferably, the tapered surface 13b is provided on the bolt head and this tapered surface cooperates with the externally projecting end of the bushing 17 to expand the bushing 17 outwardly and backwardly against the front face of the mirror 10 until the bushing takes the shape illustrated in Figure 3. In such condition, a lip 18a is turned over against the front face of the mirror 10 thereby completely shielding the mirror 10 from any contact with either the wall 12 or the supporting bolt.

Although the operation of the bushing 17 is identical in the showings of Figures 2 and 3, the fastening bolts illustrated in those figures are somewhat different. As discussed above, the bolt shown in Figure 2 is a conventional toggle type bolt except that it is provided with a tapered portion 13a and may, when tightened into its final assembled condition, be provided with a conventional bezel 21 threaded into an aperture in the end of the bolt by means of a thread extension 22. The bezel is, of course, designed to be decorative and may either be plain or embossed with a suitable design.

In the showing of Figure 3, on the other hand, a wood screw 22 is provided having a tapered portion 22a and an integral bezel shaped enlarged head 22b. Since the bezel portion 22b is a part of the screw 22, tightening means is provided in the front face of the head. In the illustration of Figure 3, this tightening means comprises a conventional "Phillips" socket 22c for cooperation with a "Phillips" wrench. It will be understood, of course, that the bolt 13, as well as the screw 22 may be provided with such an integral bezel construction and that a conventional "Allen" type hexagonal socket may be used if preferred.

In cases where it is felt that a "Phillips" or "Allen" aperture 22c is insufficiently decorative for satisfactory use, a modified form of the screw or bolt is illustrated in Figure 4. There, a bolt 23, provided with an angular surface 23a and an integral bezel-head 23b is provided with a round, threaded socket 23c and a second, smaller diameter, threaded socket 23d. The larger socket 23c is preferably provided with left-hand threads and the smaller socket 23d with right hand threads. With this arrangement, a wrench having a left hand thread complementing that of the socket 23c may be inserted in the socket 23c for turning the bolt 23 out of the wall or similar installation and, alternatively, a second threaded portion of the wrench complementing the threads of the socket 23d may be turned into the socket 23d for installing the bolt initially. Preferably, the larger diameter screw socket 23c is provided for removing the bolt since the initial installation is ordinarily simpler and requires less stress than subsequent removal in which case the parts have in some instances slightly corroded.

While it will, of course, be apparent that the provision of the tapered portions 13b, 22a, and 23a on the various modified forms of the fastening screw is desirable as an aid in rolling over the projecting portion of the rubber bushing, the bushing may be utilized with a conventional bolt when necessary. By providing the taper, however, even distribution of the rubber against the front face of the glass 10 is assured, and, further it has been found that failures in the rubber material have been minimized thereby.

While it will be understood that the dimensions of the several parts of the present invention are not extremely critical nevertheless they should be constructed such that the fastening bolt diameter is sufficiently small relative to the diameter of the aperture 14 in the glass 10 to obviate any possibility of cutting the rubber bushing, as at 18a, during mirror installation. Accordingly, while I do not intend to be bound by specific dimensions, for purposes of illustration, it has been found that for satisfactorily mounting a one-quarter inch mirror having a fastening aperture of one-quarter inch diameter, a No. 8 screw with its shank diameter of approximately .164 inch and head diameter of approximately .325 inch is very satisfactory. Such a screw has, conventionally, a taper, as at 13b, 22a, 23a, of approximately 82° included angle. With a mirror installation it is preferred, and has been found highly satisfactory, to provide approximately 5/64 inch projection of the tubular portion 18 of the rubber bushing 17 beyond the front face of the mirror 10 in its undistorted state.

It will thus be understood that I have provided a novel, unusually simple, and yet extremely effective mounting means for frangible, brittle, objects such as plate glass or mirrors. The simple one-piece bushing completely insulates the mirror, after installation, from the wall surface upon which it is supported, the shank of the supporting screw, and the head of the supporting screw. At the same time, ease of installation is substantially improved since no loose parts are included at the front of the mirror. Elimination of such small loose parts, such as washers, etc., sometimes used in mirror hanging, substantially reduces the danger of accidental breakage during installation.

Since it is clear that variations and modifications may be made in the above structure without departing from the scope of the novel concepts of the present invention, it is intended that the present invention be limited solely by the scope of the appended claims.

I claim as my invention:

1. In combination in a wall hanger for a frangible plate or the like having an aperture therethrough, a threaded supporting member having a shank of lesser diameter than the diameter of said aperture and a head of larger diameter than the diameter of said aperture, said member having a tapered portion between said shank and said head whereby the member becomes progressively larger in diameter as it approaches said head, a flanged tubular bushing in said aperture and having the flange thereof substantially larger in diameter than the diameter of said aperture and positioned between the back of said plate and said wall, a tubular portion on said bushing, said tubular portion having a diameter substantially the same as the diameter of said aperture and extending from said flange around said member and through said aperture beyond the front face of said plate, said bushing comprising a resilient rubber-like material, said head having a substantially flat surface extending from the outer-most end of said tapered portion to the peripheral edge of the head providing a compression surface acting against the projecting end of the tubular portion of the bushing without contacting the front face of said plate and said tubular portion being constructed to extend beyond the front face of said plate a distance substantially greater than the axial distance between the flat head surface of said member and the point on said tapered surface capable of maximum penetration into said aperture, the diameter of the tapered portion in a plane parallel to the flat head surface and spaced therefrom a distance substantially equal to the wall thickness of the tubular portion of the bushing being substantially less than the diameter of the aperture in said plate.

2. Structure in accordance with the provisions of claim 1 wherein the head of said member comprises a separable element taking the form of a decorative bezel.

References Cited in the file of this patent

UNITED STATES PATENTS

| | | |
|---|---|---|
| 1,082,945 | Graham | Dec. 30, 1913 |
| 1,561,003 | Leloup | Nov. 10, 1925 |
| 2,257,538 | Schlueter | Sept. 30, 1941 |
| 2,481,142 | Mueller | Sept. 6, 1949 |
| 2,560,092 | La Mater | July 10, 1951 |
| 2,678,585 | Ellis | May 18, 1954 |

FOREIGN PATENTS

| | | |
|---|---|---|
| 453,048 | Germany | Nov. 26, 1927 |
| 513,497 | Great Britain | Oct. 13, 1939 |